United States Patent
Suissa et al.

(10) Patent No.: US 7,110,477 B2
(45) Date of Patent: Sep. 19, 2006

(54) GAUSSIAN FREQUENCY SHIFT KEYING DIGITAL DEMODULATOR

(75) Inventors: Udi Suissa, Givataim (IL); Oren Eliezer, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 522 days.

(21) Appl. No.: 10/705,581

(22) Filed: Nov. 10, 2003

(65) Prior Publication Data

US 2004/0218696 A1    Nov. 4, 2004

Related U.S. Application Data

(60) Provisional application No. 60/466,684, filed on Apr. 29, 2003.

(51) Int. Cl.
*H04L 27/14* (2006.01)
*H03D 3/00* (2006.01)

(52) U.S. Cl. .................................... 375/334; 329/300
(58) Field of Classification Search ........ 375/272–278, 375/334–337; 329/333–303; 327/2, 7

See application file for complete search history.

(56) References Cited

U.S. PATENT DOCUMENTS 4,910,465 A * 3/1990 Dillman ..................... 327/7

(Continued)

OTHER PUBLICATIONS

J.B.Anderson, T. Aulin and C.E.Sunberg, Digital Phase Modulation, pp. 68-69, 76-77, 96-97, 246-275, New York, Plenum, 1986.

(Continued)

*Primary Examiner*—Don N. Vo
(74) *Attorney, Agent, or Firm*—Ronald O. Neerings; Wade James Brady III; Frederick J. Telecky Jr

(57) ABSTRACT

A digital demodulator employing a digital differential detection mechanism based on extracting phase differences directly from the I and Q signals after downconversion to zero-IF and image rejection are performed. The phase of the input I and Q signals is determined using the principle that the phase is equivalent to arctan $$\left(\frac{Q}{I}\right).$$

A lookup table stores the values of the arctan function preferably in a reduced size format. The size of the lookup table can be reduced significantly by storing arctan values for the first quadrant only (i.e. 0 to 90°) and taking advantage of the fact that the phase values for the other three quadrants can be derived from those of the first with some correction applied depending on the signs of the I and Q input samples. Phase extraction logic is provided that is operative to map the phase into the entire 0 to 360° range of phase values (i.e. $-\pi$ to $+\pi$ radians) based on the signs of the I and Q signals. The phase difference between a current phase value and the previous phase value is then calculated. It is these phase differences that reflect the frequency deviations present in the transmitted signal which represent the original modulating signal. A 'click' removal filter circuit is provided to remove the discontinuities in the phase difference output that occur when the $2\pi$ radians value is crossed.

29 Claims, 7 Drawing Sheets

U.S. PATENT DOCUMENTS

| | | | | |
|---|---|---|---|---|
| 5,144,256 A | * | 9/1992 | Lim | 329/302 |
| 6,304,136 B1 | * | 10/2001 | Rabii | 329/300 |
| 6,738,435 B1 | * | 5/2004 | Becker | 375/334 |
| 2001/0009574 A1 | * | 7/2001 | Iemura | 375/322 |

OTHER PUBLICATIONS

Jack P.F. Glas, A Differential FM Detector for Low-IF Radios, pp. 658-662, IEEE 1999.

K.Matsuyama, S.Yoshioka, M.Simizu, N.Aoki and Y.Tozawa, A Burst GFSK-Modem for Wireless LAN Systems, pp. 198-202, IEEE 1995.

* cited by examiner

LISTING 1 if ($R_{BB}[14]=1$)

$I_{SBB} = I_{BB}[15:11];$
$Q_{SBB} = Q_{BB}[15:11];$ elseif ($R_{BB}[13]=1$)

$I_{SBB} = I_{BB}[14:10];$
$Q_{SBB} = Q_{BB}[14:10];$

○
○
○
○ elseif ($R_{BB}[4]=1$)

$I_{SBB} = I_{BB}[5:1];$
$Q_{SBB} = Q_{BB}[5:1];$ else $I_{SBB} = I_{BB}[4:0];$
$Q_{SBB} = Q_{BB}[4:0];$ end

FIG.3

ATAN LUT CONTENTS $I_{SBB}$ MAGNITUDE →

$Q_{SBB}$ MAGNITUDE →

φ PHASE OUTPUT

| 101 | 59 | 41 | 31 | 25 | 21 | 18 | 16 | 14 | 13 | 12 | 11 | 10 | 9 | 9 |
| 140 | 101 | 75 | 59 | 49 | 41 | 36 | 31 | 28 | 25 | 23 | 21 | 20 | 18 | 17 |
| 160 | 126 | 101 | 82 | 69 | 59 | 52 | 46 | 41 | 37 | 34 | 31 | 29 | 27 | 25 |
| 170 | 142 | 119 | 101 | 86 | 75 | 66 | 59 | 54 | 49 | 45 | 41 | 38 | 36 | 33 |
| 176 | 152 | 132 | 115 | 101 | 89 | 79 | 72 | 65 | 59 | 55 | 51 | 47 | 44 | 41 |
| 180 | 160 | 142 | 126 | 112 | 101 | 91 | 82 | 75 | 69 | 64 | 59 | 55 | 52 | 49 |
| 183 | 165 | 149 | 135 | 122 | 110 | 101 | 92 | 85 | 78 | 73 | 68 | 63 | 59 | 56 |
| 185 | 170 | 155 | 142 | 130 | 119 | 109 | 101 | 93 | 86 | 80 | 75 | 71 | 66 | 63 |
| 187 | 173 | 160 | 148 | 136 | 126 | 116 | 108 | 101 | 94 | 88 | 82 | 78 | 73 | 69 |
| 188 | 176 | 164 | 152 | 142 | 132 | 123 | 115 | 107 | 101 | 94 | 89 | 84 | 79 | 75 |
| 189 | 178 | 167 | 156 | 146 | 137 | 129 | 121 | 113 | 107 | 101 | 95 | 90 | 85 | 81 |
| 190 | 180 | 170 | 160 | 151 | 142 | 133 | 126 | 119 | 112 | 106 | 101 | 95 | 91 | 86 |
| 191 | 182 | 172 | 163 | 154 | 146 | 138 | 130 | 124 | 117 | 111 | 106 | 101 | 96 | 91 |
| 192 | 183 | 174 | 165 | 157 | 149 | 142 | 135 | 128 | 122 | 116 | 110 | 105 | 101 | 96 |
| 193 | 184 | 176 | 168 | 160 | 152 | 145 | 138 | 132 | 126 | 120 | 115 | 110 | 105 | 101 |

FIG.5

LISTING 2

```
if Q_SBB=0 then
      arctan LUT component output is 0;
elseif I_SBB=0 then
      arctan LUT component output is 201 (=round(128*π/2));
else
      arctan LUT component output is according to the matrix
      of Fig.5, where the upper left corner is the element of
      (1,1) indexes and the lower right corner is of (15,15)
      indexes;
end
```

LISTING 3

```
if (sign(I_SBB(k)) >= 0
        if (sign(Q_SBB(k)) >= 0
            phi(k) = phi_base(k);
        else
            phi(k) = -phi_base(k);
        end
else
        if (sign(Q_SBB(k)) >= 0)
            phi(k) = round(π+128)-phi_base(k);
        else
            phi(k) = phi_base(k)-round(π+128);
        end
end
```

FIG.8

LISTING 4

```
if (delta_phi(k) > round(π))
        delta_phi(k) = delta_phi(k)-round(2π);
elseif (delta_phi(k) < -round(π)
        delta_phi(k) = delta_phi(k)+round(2π);
```

FIG.9

GAUSSIAN FREQUENCY SHIFT KEYING DIGITAL DEMODULATOR

REFERENCE TO RELATED APPLICATIONS

This application is based on U.S. Provisional application Ser. No. 60/466,684, filed Apr. 29, 2003, entitled "GFSK Digital Demodulator for Bluetooth", incorporated herein by reference in its entirety.

FIELD OF THE INVENTION

The present invention relates to the field of data communications and more particularly relates to a digital demodulator for use in a digital Gaussian frequency shift keying (GFSK) receiver such as a receiver constructed according to the Bluetooth standard.

BACKGROUND OF THE INVENTION

In digital communications systems, a carrier signal is modulated with the digital data to be transmitted over the channel, where it typically suffers various forms of distortion, such as additive noise. The digital data is often transmitted in bursts wherein each burst consists of a number of data bits. Upon reception, the signal must be demodulated in order to recover the transmitted data.

It is common for receivers to employ direct conversion (i.e. homodyne receiver) to perform the demodulation of the received signal. The received signal is mixed with a local oscillator signal at the carrier frequency to produce I (in-phase) and Q (quadrature) baseband signals. An advantage of direct conversion receivers is that they are efficient in terms of cost and current consumption. The advantage is derived from having the incoming RF signal directly downconverted to baseband, in both I and Q components, without use of any IF frequencies.

In other receivers, the incoming RF signal is mixed down first to an intermediate frequency (IF) signal and subsequently to baseband. The IF frequency may be any convenient frequency. For example, in a Bluetooth receiver, the front-end may output a low frequency IF signal (e.g., Near-Zero IF) as low as half the bandwidth of the signal (i.e. 0.5 MHz in this case).

Considering Gaussian FSK (GFSK) modulation and considering the presence of frequency offsets, the zero-IF I and Q signals can be expressed mathematically by the following.

$$I_{ZIF}=A \cos [\Phi(t)+\Delta\omega_{IF}t+\theta_n]$$

$$Q_{ZIF}=A \sin [\Phi(t)+\Delta\omega_{IF}t+\theta_n] \quad (1)$$

where A is a constant, $\Delta\omega_{IF}$ represents the frequency offset, $\Phi(t)$ represents the phase shift created by the modulating data and $\theta_n$ represents the contribution of random noise to the phase. Note that it is assumed there is no gain or phase mismatch. In Bluetooth low-IF systems, $\omega_{IF}$ is usually 500 kHz and the local oscillator frequency used for downconversion from RF to IF is given by $LO=\omega_C-\omega_{IF}$ where $\omega_c$ denotes the carrier frequency. The downconverted I signal is expressed mathematically as follows.

$$I=A \cos(\omega_{IF}t+\Phi(t)+\theta) \quad (2)$$

After downconversion from IF to zero-IF, the output signal is given by $$I=A \cos(\Phi(t)+\theta) \quad (3)$$

Differential detection of this signal calculates $$(\Phi(t)+\theta(t))-(\Phi(t-T)+\theta(t-T))=>\Delta\Phi \quad (4)$$

where T represents the symbol time. In Bluetooth systems, the symbol time T is 1 microsecond. The result of differential detection yields $\sin(\Delta\Phi)$, which for small values of $\phi$ can be approximated as simply $\Delta\Phi$.

Numerous prior art analog techniques are available to perform the demodulation required to generate accurate output data. The modem trend, however, is to provide single chip solutions to communication applications. This requires all digital realization of all or most of the receiver circuitry in the radio. Digital realization of the radio for inclusion in single chip implementations is desirable because it offers a high performance solution at low current consumption and low gate count and hence reduced size and cost. These benefits are driving the current trend to realize as much of the radio digitally for placement on a single chip.

Any digital demodulator implementation, in particular digital demodulation of GFSK, must be able to perform in the presence of additive white Gaussian noise (AWGN), interference and frequency offsets. Frequency offsets are another form of distortion of the received signal, since they are random and must be resolved adequately in the receiver to minimize the performance degradation they cause. Considering a communication system constructed to receive GFSK in accordance with the Bluetooth standard, the receiver must be constructed to deal with frequency offsets in order to generate a reliable output signal. There exist several sources of frequency offset errors in a Bluetooth communication system as highlighted below.

First, the Bluetooth specification permits a frequency error of up to 75 kHz in the transmitted signal. Second, the Bluetooth specification also permits up to 20 ppm of frequency inaccuracy in the receiver crystal reference, which could result in up to 50 kHz of frequency offset in the receiver's local oscillator which is used in the downconversion. Further, an additional frequency offset of up to 40 kHz is allowed in the transmitted signal during transmission of long packets. Lastly, an additional 15 kHz of frequency offset may be due to clock jitter caused by using clocks derived from dividing the master local clock signal, wherein the local clock signal is hopping from frequency to frequency resulting in jitter. This frequency offset could be avoided by using more accurate clocks without clock division. Note that the first two frequency offsets are constant in nature and due to the open loop configuration of the transmitter permitted under the Bluetooth standard.

Thus, an IF signal at the receiver's demodulator input may have a total of up to 180 kHz in frequency offset. Considering a nominal frequency deviation of +/−160 kHz for a modulation index of h=0.32, in accordance with the Bluetooth specification, a possible frequency offset of 180 kHz makes reception virtually impossible. Note that using a lower modulation index of 0.28, which the Bluetooth specification allows, makes the problem even worse.

Thus, there is a need for a digital demodulator, suitable for single chip implementations, that meets the requirements of the Bluetooth specification and that overcomes the problems and disadvantages of the prior art.

SUMMARY OF THE INVENTION

The present invention solves the problems of the prior art by providing a digital demodulator employing a digital differential detection mechanism. The mechanism is based on extracting phase differences directly from the I and Q signals after downconversion to zero-IF and image rejection are performed. The phase Φ represented by the quadrature I and Q signals is determined using the relationship $$\varphi = \arctan\left(\frac{Q}{I}\right).$$

A lookup table stores the values of the arctan function preferably in a reduced size format. The size of the lookup table can be reduced significantly by storing arctan values for the first quadrant only (i.e. 0 to 90°) and taking advantage of the fact that the phase values for the other three quadrants can be derived from those of the first by separately considering the magnitude and the sign of the I and Q samples. Phase extraction logic is provided that is operative to map the phase into the entire 0 to 360° range of phase values (i.e. $-\pi$ to $+\pi$ radians) based on the signs of the I and Q signals.

In addition to the reduction of the lookup table size by a factor of four (i.e. only a quarter of the range needs to be covered due to the use of the phase extraction logic), further optimization of the lookup table is made regarding the quantization/resolution of its contents. In particular, the required size of the lookup table in an example embodiment presented herein is only 225 words (i.e. bytes). The reduction in the size of the lookup table is achieved by the use of a per sample scaler that functions to compress a 16-bit input into a 5-bit output while maintaining the $$\frac{Q}{I}$$

ratio at a sufficient accuracy that does not compromise receiver performance.

An additional digital processing block is used to determine the phase differences between a current phase value and the previous phase value. It is these phase differences that reflect the frequency deviations present in the received signal which represent the original modulating signal. Further, a 'clicks' filter circuit is provided that is operative to remove the discontinuities in the phase difference output that occur around $2\pi$ radians.

Several advantages of the digital demodulator of the present invention include the ability to be implemented in a very small size, and therefore low cost, compared with prior art solutions. In addition, the mechanism is operative to extract actual phase differences wherein frequency offsets are translated to DC offsets, thereby greatly simplifying frequency offset compensation in subsequent processing. This is in comparison to prior art differential demodulators which typically generate the sine, cosine or other nonlinear function of the phase difference, which greatly complicates frequency offset estimation and compensation resulting in either added complexity or degraded performance for certain values of frequency offsets.

Another advantage of the mechanism of the present invention is that phase extraction is operative to generate signals with linear noise terms. This is in contrast to prior art solutions wherein the resultant noise terms are nonlinear and correlated to the data due the multiplications typically performed. Linearity of the noise in the presence of intersymbol interference (ISI) serves to simplify the realization of equalizers placed after the demodulator and provide enhanced performance.

A further advantage of the mechanism is that the it enables subsequent frequency offset compensation that can be implemented very simply and which can be performed in a feed forward manner without requiring a closed loop architecture. Since frequency offsets are translated into DC offsets, the frequency offsets are easier to extract and suppress as compared to prior art cross-multiply architectures typically used for digital demodulation, which have the disadvantage of introducing distortion when frequency offsets are present.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is therefore provided in accordance with the invention, a differential detector for use in a digital frequency shift keying (FSK) receiver comprising first means for receiving a scaled I signal and a scaled Q signal and determining the absolute value thereof to yield an absolute scaled I signal and an absolute scaled Q signal, an arctan lookup table (LUT) for outputting a first phase value in accordance with each absolute scaled I signal and absolute scaled Q signal pair and second means for generating a delta phase value in accordance with the first phase value and a previous first phase value delayed one symbol time.

There is also provided in accordance with the invention, a method of differential detection for use in a digital frequency shift keying (FSK) receiver, the method comprising the steps of receiving a scaled I signal and a scaled Q signal and determining the absolute value thereof to yield an absolute scaled I signal and an absolute scaled Q signal, providing an arctan lookup table (LUT) adapted to output a preliminary phase value in the range of 0 to $$\frac{\pi}{2}$$

in accordance with each absolute scaled I signal and absolute scaled Q signal pair, determining a resolved phase value in the range of $-\pi$ to $+\pi$ in accordance with the sign of the scaled I signal and the scaled Q signal and generating a delta phase value in accordance with the resolved phase value and a previous resolved phase value delayed one symbol time.

There is further provided in accordance with the invention, a differential demodulator for use in a digital frequency shift keying (FSK) receiver comprising first means for receiving a scaled I signal and a scaled Q signal and determining the absolute value thereof to yield an absolute scaled I signal and an absolute scaled Q signal, second means for providing an arctan lookup table (LUT) adapted to output a first phase value in the range of 0 to $$\frac{\pi}{2}$$

in accordance with each absolute scaled I signal and absolute scaled Q signal pair, third means for determining a second phase value in the range of –π to +π in accordance with the sign of the scaled I signal and the scaled Q signal and fourth means for generating a delta phase value in accordance with the second phase value and a previous second phase value delayed one symbol time.

BRIEF DESCRIPTION OF THE DRAWINGS

The invention is herein described, by way of example only, with reference to the accompanying drawings, wherein:

FIG. 3 is a pseudo code listing illustrating the selection logic portion of the baseband scaler in more detail;

FIG. 5 is a table illustrating the contents of the arctan look up table used in the arctan differential detector;

FIG. 8 is a pseudo code listing illustrating the operation of the phase extractor portion of the Arctan differential detector; and FIG. 9 is a pseudo code listing illustrating the operation of the 'clicks' filter portion of the arctan differential detector.

DETAILED DESCRIPTION OF THE INVENTION

Notation Used Throughout

Figure 1:
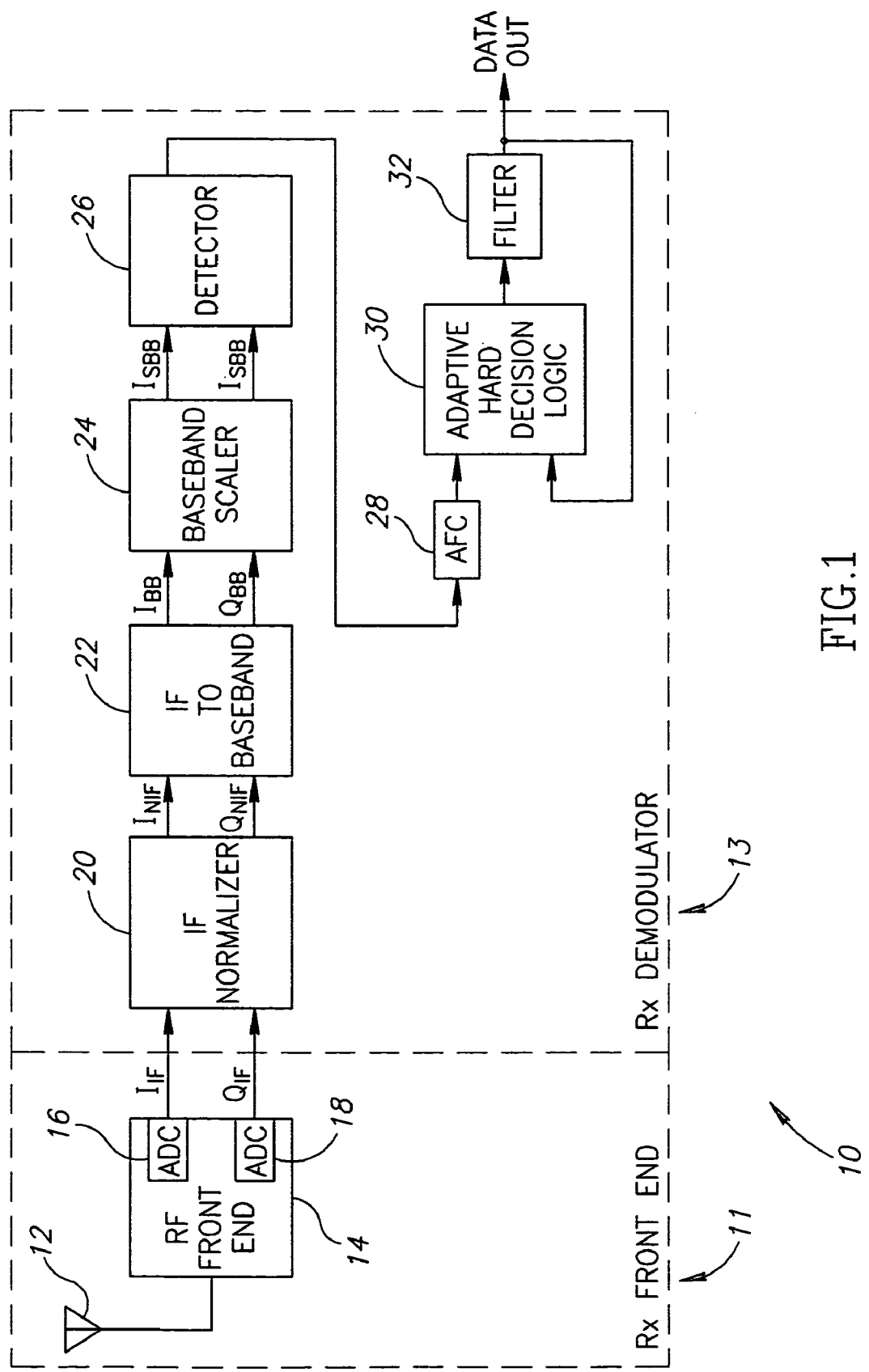
FIG. 1 is a block diagram illustrating an example GFSK receiver including a digital demodulator constructed in accordance with the present invention.

The following notation is used throughout this document.

| Term | Definition |
|---|---|
| AFC | Automatic Frequency Control |
| AHDL | Adaptive Hard Decision Logic |
| ASIC | Application Specific Integrated Circuit |
| AWGN | Additive White Gaussian Noise |
| BER | Bit Error Rate |
| DC | Direct Current |
| FPGA | Field Programmable Gate Array |
| FSK | Frequency Shift Keying |
| GFSK | Gaussian Frequency Shift Keying |
| HDL | Hardware Description Language |
| IF | Intermediate Frequency |
| ISI | Intersymbol Interference |
| LO | Local Oscillator |
| LSB | Least Significant Bit |
| LUT | Look-Up Table |
| MSB | Most Significant Bit |
| RAM | Random Access Memory |
| ROM | Read Only Memory |
| RF | Radio Frequency |

Detailed Description of the Invention

The mechanism of the present invention is based on extracting phase differences directly from the I and Q signals after downconversion to zero-IF and image rejection are performed. The phase Φ represented by the quadrature I and Q signals is determined using the relationship $$\varphi = \arctan\left(\frac{Q}{I}\right).$$

A lookup table stores the values of the arctan function preferably in a reduced size format. The size of the lookup table can be reduced significantly by storing arctan values for the first quadrant only (i.e. 0 to 90°) and taking advantage of the fact that the phase values for the other three quadrants can be derived from those of the first by separately considering the magnitude and the sign of the I and Q samples. Phase extraction logic is provided that is operative to map the phase into the entire 0 to 360° range of phase values (i.e. –π to +π radians) based on the signs of the I and Q signals.

In addition to the reduction of the lookup table size by a factor of four (i.e. only a quarter of the range needs to be covered due to the use of the phase extraction logic), further optimization of the lookup table is made regarding the quantization/resolution of its contents. In particular, the required size of the lookup table in an example embodiment given is only 225 words (i.e. bytes). The reduction in the size of the lookup table is achieved by the use of a per sample scaler that functions to compress a 16-bit input into a 5-bit output while maintaining the $$\frac{Q}{I}$$

ratio at a sufficient accuracy which does not compromise receiver performance.

An additional digital processing block is used to determine the phase differences between a current phase value and the previous phase value. It is these phase differences that reflect the frequency deviations present in the received signal which represent the original modulating signal. Further, a 'clicks' filter circuit is provided that is operative to remove the discontinuities in the phase difference output that occur around 2π radians.

The mechanism can be used, as shown in an example embodiment, in a multi-stage scheme to perform differential detection of the I and Q input signals. The present invention is well suited for use in a digital FSK receiver such as a Gaussian Frequency Shift Keying (GFSK) detector constructed according to the Bluetooth specification.

It is noted that the present invention is not limited to use with any particular modulation or communication system. Throughout this document the invention is described in reference to a Bluetooth communication system. Note that the invention is not limited to this communications system, as one skilled in the relevant electrical arts can apply the digital demodulator with arctan based differential detector mechanism of the present invention to other communication systems without departing from the spirit and scope of the present invention. Depending on the particular application and implementation, the invention is applicable for use in a multitude of communication systems, modulations and protocols. In general, the digital demodulator with arctan based differential detector mechanism of the present invention is applicable in systems where it is desirable to have frequency offsets translated to DC offsets, so as to simplify their suppression, such as in Bluetooth systems. Such needs may be encountered not only in wireless communication systems, such as those based on the Bluetooth standard, but also in non-wireless or non communication systems.

A block diagram illustrating an example GFSK receiver including a digital demodulator constructed in accordance with the present invention is shown in FIG. 1. The example receiver, generally referenced 10, comprises an Rx front end portion 11 and Rx demodulator portion 13. The Rx front end portion comprises an antenna 12, RF front end circuit 14 including analog to digital converter 16 for the inphase I signal and analog to digital converter 18 for the quadrature phase Q signal. The outputs of the Rx front end are the IF I and Q signals, $I_{IF}$ and $Q_{IF}$. The Rx demodulator comprises IF normalizer 20, IF to baseband converter 22, baseband scaler 24, differential detector 26, automatic frequency control (AFC) 28, adaptive hard decision logic (AHDL) 30 and filter 32. The data out signal is the recovered original signal, which was encoded, modulated and transmitted by the transmitter. Depending on the level of signal and interference received at the antenna, this recovered signal may have between 0 and 50% of erroneous bits in it when compared with the original data transmitted.

The RF front end performs the amplification, mixing and filtering functions to generate both the I and Q signal paths. The I and Q signals are converted to digital form by analog to digital converters 16, 18. The resulting $I_{IF}$ and $Q_{IF}$ digital signals are input to the IF normalizer, which is responsible for several tasks including DC offset compensation, prescaling and Automatic Gain Control (AGC) management for the entire receiver. Note that the term normalizer is intended to indicate that the IF signals are processed in order to bring their amplitudes to within a predefined working region such that they may be handled properly by subsequent processing stages within the GFSK demodulator 13.

Figure 2:
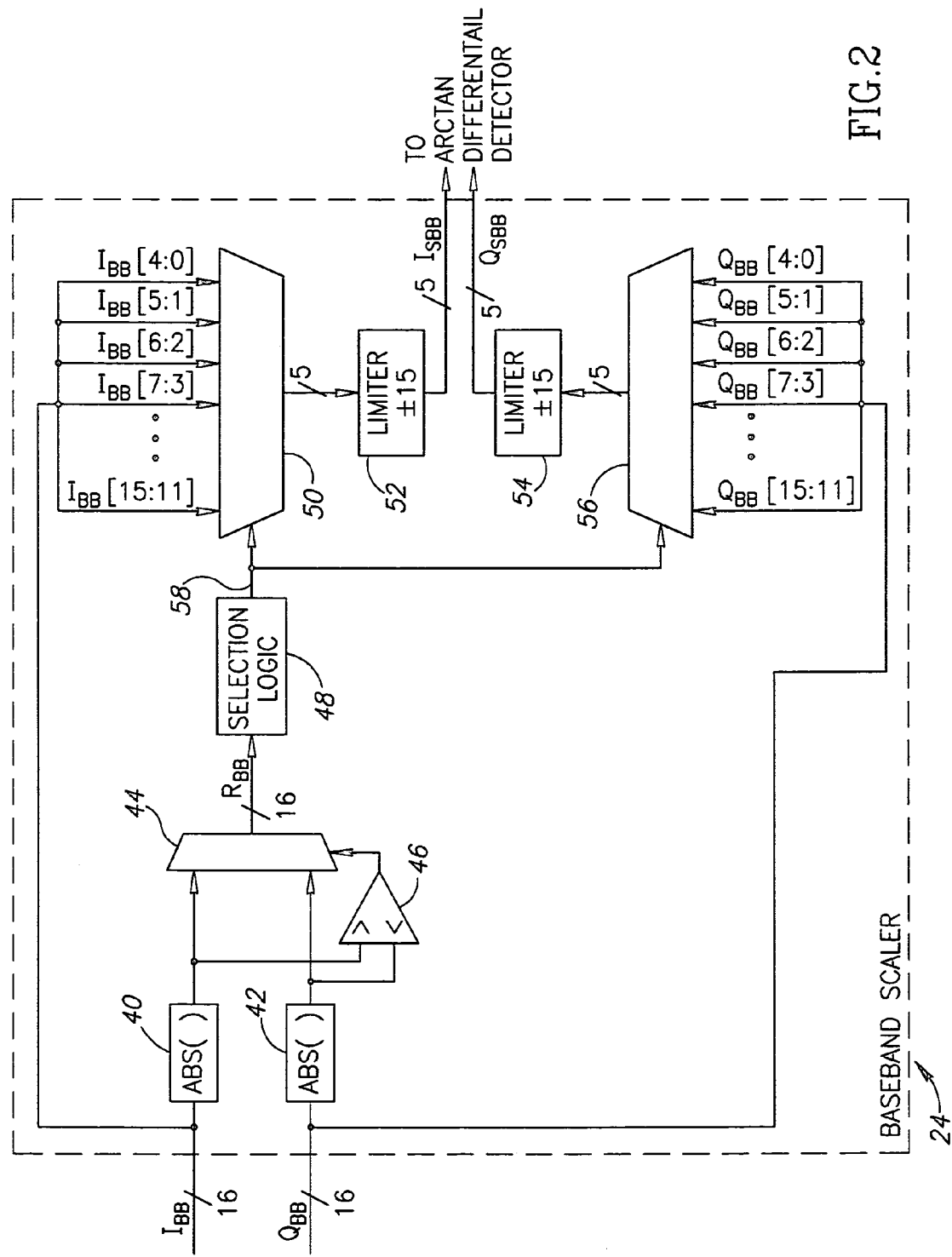
FIG. 2 is a block diagram illustrating the baseband scaler portion of the GFSK receiver in more detail.

The operation of the baseband scaler will now be described in more detail. A block diagram illustrating the baseband scaler portion of the GFSK receiver in more detail is shown in FIG. 2. The adaptive baseband scaler module is operative to reduce the resolution of the I and Q signals from their nominal width of 16-bits signed to 5-bits signed while (1) maintaining the ratio of $$\frac{Q}{I}$$

which is required for the proper operation of the arctan differential detector 26 (FIG. 1); and (2) preserving sufficient content to obtain sufficient phase resolution from the arctan differential detector. The reduction in resolution enables the size of the detector to be significantly reduced.

The baseband scaler, generally referenced 24, comprises an absolute function 40, 42 for the baseband I and Q signals $I_{BB}$ and $Q_{BB}$, respectively, multiplexer 44, comparator 46, selection logic 48, multiplexers 50, 56 and limiters 52, 54. The baseband scaler functions to determine the five highest active bits of $I_{BB}$ and $Q_{BB}$ during each sample and to output them as scaled baseband values $I_{SBB}$ and $Q_{SBB}$. The selection of the five most active bits to route from the 16-bit full resolution I and Q signals is made according to the signal having the larger absolute value at each specific sample time. The logic in this block is preferably combinatorial since each I/Q sample pair generates a potentially different routing. The scaled baseband I and Q signals must be limited to ±15 (i.e. 4-bits in magnitude) for the subsequent detection stage.

In operation, the baseband scaler first determines the absolute value of the baseband I and Q signals which each comprise 16-bits and compares the absolute values via comparator 46 to determine the larger one. The larger signal is selected and output by multiplexer 44 as a 16-bit result signal $R_{BB}$. The selection logic 48 checks for the first '1' bit and generates the appropriate selection control signal 58 which is applied to both I and Q multiplexers 50, 56, respectively. Both multiplexers have twelve 5-bit inputs comprising bits 15:11 through 4:0. The 5-bit output is passed through a limiter which functions to limit the values to ±15. Thus, a value of −16 is forced to −15. This is so that the absolute value function in the subsequent detector module does not generate +16 which would require 5-bits to represent, wherein the lookup table indexes are designed for 4-bits.

The selection logic 48 will now be described in more detail. A pseudo code listing illustrating the selection logic portion of the baseband scaler in more detail is shown in FIG. 3. Once the value $R_{BB}$ (i.e. the larger of abs(I) and abs(Q) values) is determined, its position in the range of 1 to $2^{15}$ must be determined whereby the range is divided into slices of powers of 2, namely: $2^{15}$ to $2^{14}$, $2^{14}$ to $2^{13}$, $2^{13}$ to $2^{12}$, ..., $2^5$ to $2^4$. The position of $R_{BB}$ in a specific slice determines which bits of I and Q to route. For example, if $R_{BB}$ belongs to the slice $2^{12}$ to $2^{11}$ 12, 11, 10, 9 and 8 of I and Q are to be routed. This ensures that the signal which is absolutely larger, will be in the range of 8 to 15 after scaling. Note that the logic selection is simplified since only the bits from MSB (not including the sign bit) to LSB in descending order need be examined. The pseudo code shown in Listing 1 (FIG. 3) implements this scheme. Note that the scheme is scalable to any word length for I and Q of both input and output scaled values.

Figure 4:
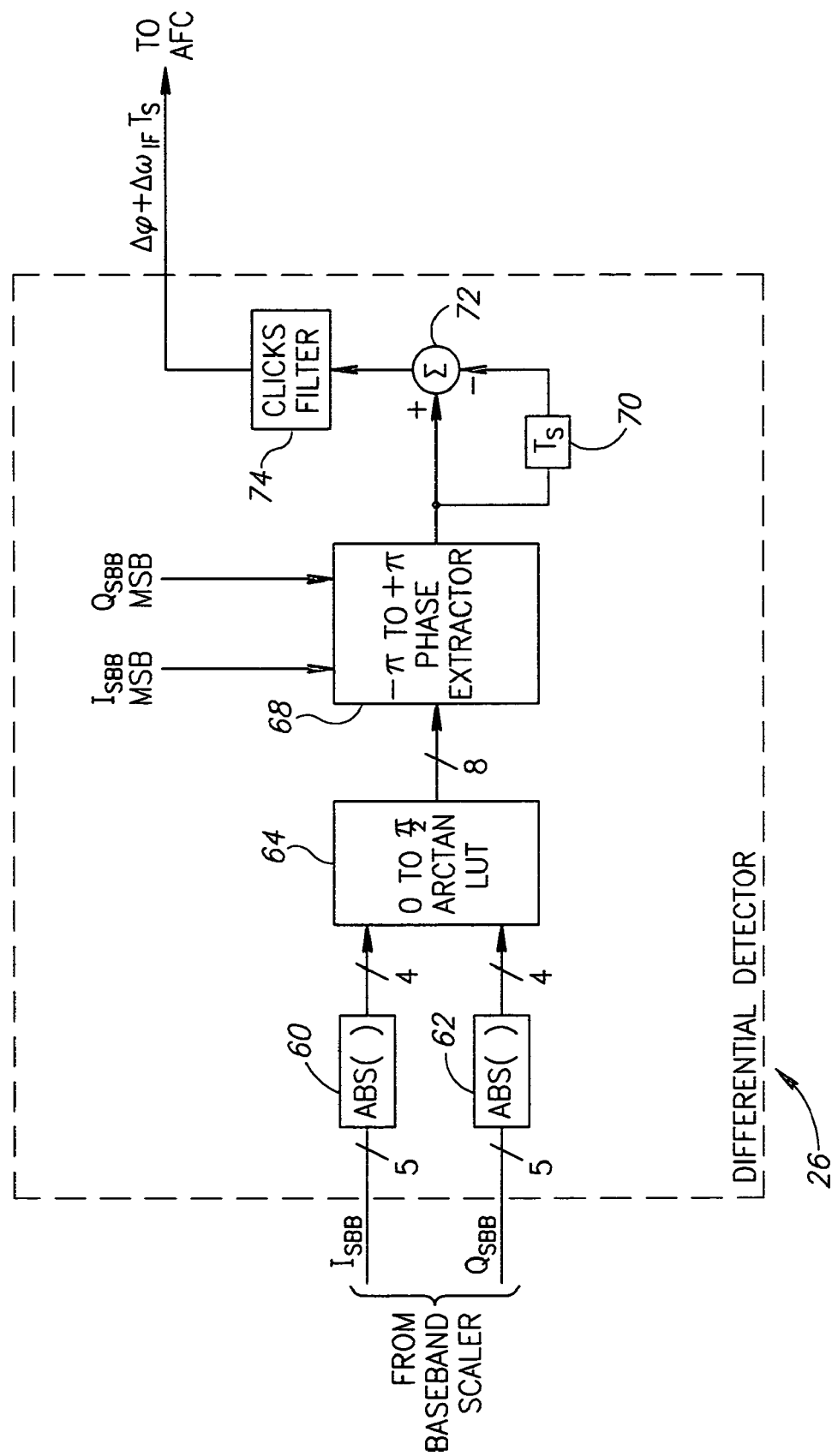
FIG. 4 is a block diagram illustrating the arctan differential detector portion of the GFSK receiver in more detail.

The operation of the detector 26 (FIG. 1) will now be described in more detail. A block diagram illustrating the arctan differential detector portion of the GFSK receiver in more detail is shown in FIG. 4. The arctan differential detector, generally referenced 26, comprises I and Q absolute value blocks 60, 62, arctan lookup table 64, phase extractor 68, symbol delay 70, summer 72 and 'clicks' filter 74.

The arctan differential detector is operative to extract the instantaneous phase using the scaled I and Q signals $I_{SBB}$ and $Q_{SBB}$, respectively. The I and Q signals can be expressed as shown in Equation 1. The argument of both cosine and sine functions, denoted φ(t) is equivalent to the arctan $$\left(\frac{Q}{I}\right)$$

as expressed below.

$$\phi(t) = \varphi(t) + \Delta\omega_{IF}t + \theta_n = \arctan\left(\frac{Q}{I}\right) \quad (5)$$

Assuming phase noise does not change much during a symbol time we can consider a constant phase noise $\theta_n$, and the phase difference between two consecutive symbols can be expressed as $$\phi(t)-\phi(t-T_S)=\Delta\Phi+\Delta\omega_{IF}T_S \qquad (6)$$

wherein $T_S$ is the symbol time, $\Delta\Phi$ represents the differential phase and $\Delta\omega_{IF}T_S$ represents the frequency offset which is output as a DC offset level which can be compensated relatively easily using well known DC offset suppression techniques. The differential phase $\Delta\Phi$ is input to a 'clicks' filter which removes the discontinuities that occur around $\Phi=2\pi$ radians.

The main functional components of the arctan detector module are described below. The arctan lookup table (LUT) 64 is adapted to store 8-bit phase values $\Phi$ for 0 to $$\frac{\pi}{2}$$

only (i.e. quadrant I>0, Q>0 only). The $2\pi$ phase extractor 68 functions to map the phase to the correct quadrant using the sign (i.e. the MSB) of the I and Q input scaled baseband signals, which the LUT does not use.

A table illustrating the contents of the arctan LUT 64 is shown in FIG. 5. The arctan lookup table receives as input the 4-bit magnitude of the scaled baseband I and Q signals. The abs( ) block 60 outputs the 4-bit magnitude of the scaled I baseband signal $I_{SBB}$ while the abs( ) block 62 outputs the 4-bit magnitude of the scaled Q baseband signal $Q_{SBB}$, both of which are represented in two's complement form. Considering the lookup table as a matrix, then $Q_{SBB}$ comprises the row index while $I_{SBB}$ comprises the column index. For each (row, column) pair the lookup table is adapted to output an 8-bit representation for the value of arctan $$\left(\frac{Q_{SBB}}{I_{SBB}}\right).$$

In general, the output size is preferably chosen such that a specific performance degradation criteria be met. In the example provided herein, the 8-bit representation was chosen to meet a performance degradation criteria of 0.2 dB loss in receiver sensitivity compared to an arbitrarily high number of bits per LUT word. It should be noted that the choice of a particular size could change once a receiver of such structure is to be used in a different application where the modulation scheme or performance requirements are different. Reducing the size permits reducing receiver size and cost but may compromise performance. Thus, there is an optimization procedure associated with the selection of the size at the time of design.

Note that $I_{SBB}$ and $Q_{SBB}$ each comprise 5-bits and are limited in the baseband scaler to values of ±15 wherein −16 is not permitted. The abs( ) blocks output their magnitudes which function as the indices to the lookup table. The output of the lookup table is a two's complement 8-bit wide signal. Since each index can comprise one of 16 values (i.e. 0 to 15), it would appear that a matrix of 16×16=256 values is needed. Since the cases of row_index=0 and column_index=0 each yield a constant value, however, then only 15×15=225 values are required in the matrix illustrated in FIG. 5.

Figures 6, 7:
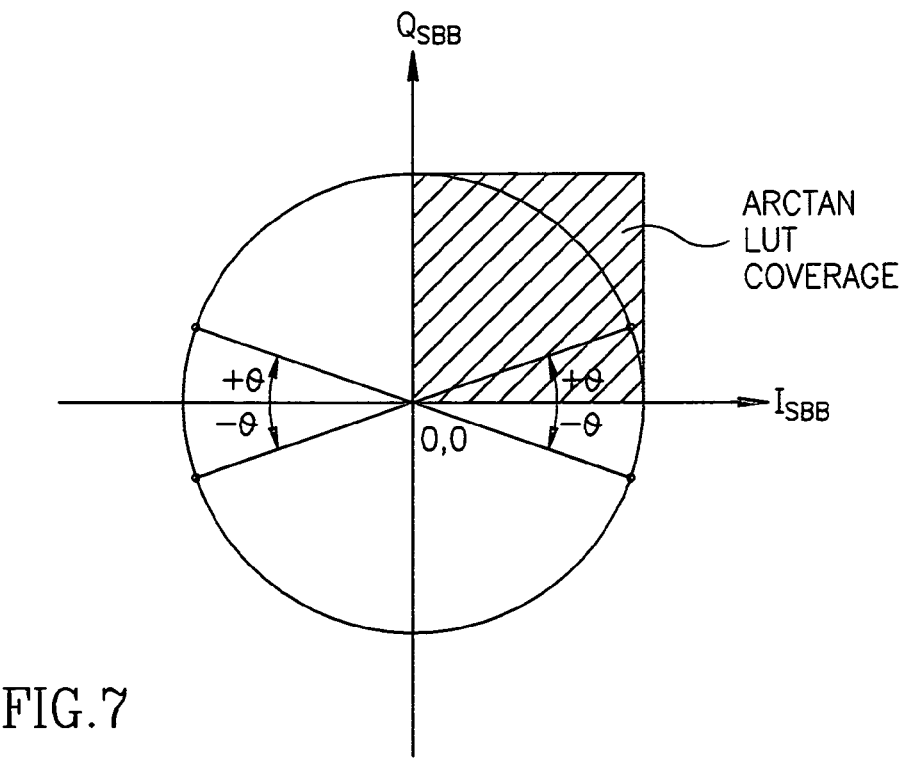
FIG. 6 is a pseudo code listing illustrating the handling of the special cases where the row and/or column index is zero.
FIG. 7 is a graph of the I/Q plane illustrating the range covered by the arctan look up table.

The outputs resulting from the special cases of row_index=0 and/or column_index=0 are provided by pseudo code Listing 2 illustrated in FIG. 6. This pseudo code listing handles the cases where the arctan argument is either zero or infinity (i.e. 90°). It is appreciated that one skilled in the art may generate an arctan LUT other than that shown herein in accordance with the desired index width. The 15×15 table illustrated herein fits within a 256×8 memory (only 225 bytes required, however). Depending on the width of each phase value and the width of the indices, a memory larger or smaller that that shown herein will be required.

A graph of the I/Q plane illustrating the range covered by the arctan LUT is shown in FIG. 7. The two crossing diagonal lines represent phase shifts in the modulated signal which result from the frequency deviations representing the modulating data. In the Bluetooth example provided herein, the nominal peak frequency deviations experienced for sufficiently long sequences of "0" or "1", are ±160 kHz, which over a single symbol duration of 1 μsec may create phase shifts of ±2·π·160k·1 μsec=±57.6°. The received signal, however, may have frequency offsets as much as ±180 kHz, which could result in greater phase shifts over a symbol period. The hatched area in the first quadrant represents the range of phase values covered by the arctan LUT. The four points on the unit circle all represent the same phase output from the arctan LUT. The correct phase can only be determined by examining the signs of both the scaled I and Q baseband signals.

A pseudo code listing illustrating the operation of the phase extractor portion of the arctan differential detector is shown in FIG. 8. The pseudo code Listing 3 describes the logic implemented by the phase extractor module. Note that round($\pi$*128)=402, phi_base(k) is the value obtained from the arctan lookup table at indices [abs($Q_{SBB}$),abs($I_{SBB}$)] and phi(k) is the phase value output by the phase extractor.

A differential phase value is then generated from the output of the phase extractor. The output of a one symbol delay 70 is subtracted from the current phase output to generate a differential phase value. This differential phase is then input to the clicks filter 74.

A pseudo code listing illustrating the operation of the clicks filter portion of the arctan differential detector is shown in FIG. 9. As described previously, discontinuities in the phase occur in the output of the phase extractor due to the wrapping of the phase around the −$\pi$ to +$\pi$ range. The discontinuity when moving from −$\pi$ to +$\pi$ or back generates much higher phase differences between symbols that cross this point (i.e. cause the phase to wrap around the −$\pi$ to +$\pi$ range) than expected by either the modulation or possible frequency offsets. The pseudo code Listing 4 in FIG. 9 functions to remove these 'clicks' or wrap arounds by checking for the conditions of delta_phi being greater than +$\pi$ or less than −$\pi$. Note that the value of delta_phi cannot be much greater than $\Delta\Phi=\pm\pi\cdot h$, where h is the nominal modulation index (h=0.32 according to the Bluetooth specification). This was shown above to be $\Delta\Phi_{max}=\pm57.6°$.

The differential phase $\Delta\Phi$ output of the detector is input to the AFC module 28 (FIG. 1). The function of the AFC block is to compensate for the influence of frequency deviations of the input spectrum from its intended center (i.e. the IF frequency) on the output data. It is noted that in the example implementation presented herein, the range of frequency offsets that must be handled is 125 kHz as implied by the Bluetooth specification (maximum of ±75 kHz of frequency error in the transmitter, and typically a ±20 ppm reference clock used for the 2.4 GHz local oscillator in the receiver, which can cause up to about ±50 kHz of additional frequency offset), plus ±40 kHz of drift allowed during long packet reception, plus ±15 kHz caused by inaccuracies in the A/D clock (for a specific implementation), for a total of ±180 kHz of possible frequency offset.

Frequency offsets on the modulated signal are translated to DC offsets and added to the phase difference output of the differential detector. Thus, the role of the AFC is to estimate and compensate for the DC offset of the differential detector output. One possible scheme to estimate the DC offset is based on tracking the upper and lower peaks of the signal and calculating an average therefrom. The average is then subtracted from the signal to compensate for the offsets.

The output of the AFC is input to the Adaptive Hard Decision Logic (AHDL)/Filter which is operative to make hard decisions based on the phase difference between two symbols. The AHDL can be implemented using well known slicing techniques or any other scheme that is able to recover the original data.

It is noted that, in general, the number of words $W_n$ in the LUT needed for a receiver based on the present invention could be $W_n=(N-1)^2$ if implemented as a ROM/RAM block, where N is the number of bits used to represent the $I_{SBB}$ and $Q_{SBB}$ signals. The total memory size M in bits would be $M=W_n \times W_s$, where $W_s$ represents the word size (i.e. 8 in the example given herein). It is noted, however, that for a combinatorial logic based LUT (i.e. ROM function only), further reduction is possible by making use of the relationship Memory(x,y)=S−Memory(y,x), which is equivalent to the trigonometric identity $$\arctan\left(\frac{y}{x}\right) = 90° - \arctan\left(\frac{x}{y}\right) \quad (7)$$

wherein S represents the value for $$90° \left(\frac{\pi}{2} \text{ radians}\right),$$

and equals 201 in the example given in FIG. 5. The diagonal of the LUT, where x=y (or $I_{SBB}=Q_{SBB}$), corresponding to φ=45°, is Memory(x,x)=round(S/2), which equals 101 in the example.

The redundancy in the expression Memory(x,y)=S−Memory(y,x), may be exploited by preceding the LUT with a function that would determine whether $I_{SBB}>Q_{SBB}$ and accordingly assigning either $x=I_{SBB}$ and $y=Q_{SBB}$ or $y=I_{SBB}$ and $X=Q_{SBB}$. If the LUT outputs the arctan(y/x), then for the latter a correction of the LUT output of φ=S−LUTout must be made.

The LUT may be reduced further by replacing the diagonal with a single value that would be produced whenever the inputs x and y (scaled values for I and Q) are equal. The circuitry required to implement this reduction in LUT size would only be worthwhile in terms of gate count reduction above a certain word size N.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A differential detector for use in a digital frequency shift keying (FSK) receiver, comprising:
    first means for receiving a scaled I signal and a scaled Q signal and determining the absolute value thereof to yield an absolute scaled I signal and an absolute scaled Q signal;
    an arctan lookup table (LUT) for outputting a first phase value in accordance with each absolute scaled I signal and absolute scaled Q signal pair; and
    second means for generating a delta phase value in accordance with said first phase value and a previous first phase value delayed one symbol time.

2. The detector according to claim 1, wherein said first-phase value output by said arctan look up table is in the range of 0 to $$\frac{\pi}{2}.$$

3. The detector according to claim 1, further comprising a phase extractor operative to translate said first phase value output by said arctan lookup table in the range of 0 to $$\frac{\pi}{2}$$

to a second phase value in the range of −π to +π in accordance with the sign of said scaled I signal and said scaled Q signal.

4. The detector according to claim 1, wherein said scaled I signal and said scaled Q signal are generated by a baseband scaler module adapted to compress the bit representation of an input I signal and an input Q signal while maintaining their ratio of Q/I.

5. The detector according to claim 1, further comprising a clicks filter adapted to remove the discontinuity caused by said delta phase value wrapping around the −π to +π range.

6. The detector according to claim 1, wherein said arctan LUT comprises a 15 by 15 matrix of values.

7. The detector according to claim 1, further comprising means for reducing said arctan lookup table by a factor of approximately 2 utilizing the relationship arctan(x/y)=90°−arctan(y/x).

8. The detector according to claim 1, wherein frequency offsets within said scaled I signal and said scaled Q signal translate to DC offsets at the output of said arctan lookup table.

9. The detector according to claim 1, adapted to be implemented in an Application Specific Integrated Circuit (ASIC).

10. The detector according to claim 1, adapted to be implemented in a Field Programmable Gate Array (FPGA).

11. The detector according to claim 1, adapted to be implemented partially or entirely in software adapted to execute on an embedded microprocessor or digital signal processor.

12. A method of differential detection for use in a digital frequency shift keying (FSK) receiver, said method comprising the steps of:

receiving a scaled I signal and a scaled Q signal and determining the absolute value thereof to yield an absolute scaled I signal and an absolute scaled Q signal;

providing an arctan lookup table (LUT) adapted to output a preliminary phase value in the range of 0 to $\frac{\pi}{2}$ in accordance with each absolute scaled I signal and absolute scaled Q signal pair;

determining a resolved phase value in the range of $-\pi$ to $+\pi$ in accordance with the sign of said scaled I signal and said scaled Q signal; and generating a delta phase value in accordance with said resolved phase value and a previous resolved phase value delayed one symbol time.

13. The method according to claim 12, wherein said scaled I signal and said scaled Q signal are scaled by compressing the bit representation of the input I signal and input Q signal while maintaining their ratio of Q/I.

14. The method according to claim 12, further comprising the step of removing the discontinuity caused by said delta phase value wrapping around the $-\pi$ to $+\pi$ range.

15. The method according to claim 12, wherein said arctan LUT comprises a 15 by 15 matrix of values.

16. The method according to claim 12, further comprising the step of further reducing said arctan LUT by a factor of approximately 2 utilizing the trigonometric identity arctan (y/x)=90°−arctan(x/y).

17. The method according to claim 12, wherein frequency offsets within said scaled I signal and said scaled Q signal translate to DC offsets at the output of said arctan lookup table.

18. The method according to claim 12, adapted to be implemented in an Application Specific Integrated Circuit (ASIC).

19. The method according to claim 12, adapted to be implemented in a Field Programmable Gate Array (FPGA).

20. The method according to claim 12, adapted to be implemented partially or entirely in software adapted to execute on an embedded microprocessor or digital signal processor.

21. A differential demodulator for use in a digital frequency shift keying (FSK) receiver, comprising:

first means for receiving a scaled I signal and a scaled Q signal and determining the absolute value thereof to yield an absolute scaled I signal and an absolute scaled Q signal;

second means for providing an arctan lookup table (LUT) adapted to output a first phase value in the range of 0 to $\frac{\pi}{2}$ in accordance with each absolute scaled I signal and absolute scaled Q signal pair;

third means for determining a second phase value in the range of $-\pi$ to $+\pi$ in accordance with the sign of said scaled I signal and said scaled Q signal; and fourth means for generating a delta phase value in accordance with said second phase value and a previous second phase value delayed one symbol time.

22. The demodulator according to claim 21, wherein said scaled I signal and said scaled Q signal are scaled by compressing the bit representation of an I signal and a Q signal while maintaining a ratio of Q/I.

23. The demodulator according to claim 21, further comprising the step of removing the discontinuity caused by said delta phase value wrapping around the $-\pi$ to $+\pi$ range.

24. The demodulator according to claim 21, wherein said arctan LUT comprises a 15 by 15 matrix of values.

25. The demodulator according to claim 21, further comprising means for reducing said arctan lookup table by a factor of approximately 2 utilizing the relationship arctan (x/y)=90°−arctan(y/x).

26. The demodulator according to claim 21, wherein frequency offsets within said scaled I signal and said scaled Q signal translate to DC offsets at the output of said arctan lookup table.

27. The demodulator according to claim 21, adapted to be implemented in an Application Specific Integrated Circuit (ASIC).

28. The demodulator according to claim 21, adapted to be implemented in a Field Programmable Gate Array (FPGA).

29. The demodulator according to claim 21, adapted to be implemented partially or entirely in software adapted to execute on an embedded microprocessor or digital signal processor.

* * * * *